United States Patent
Tifford et al.

(10) Patent No.: US 8,682,756 B1
(45) Date of Patent: Mar. 25, 2014

(54) VISUAL REPRESENTATION AND USER FEEDBACK ON CALCULATED FORM FIELDS

(75) Inventors: Alan Tifford, San Diego, CA (US); Christine A. De Sanctis, San Diego, CA (US); Kenichi Mori, Carlsbad, CA (US); Qwan T. Pham, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 772 days.

(21) Appl. No.: 12/846,717

(22) Filed: Jul. 29, 2010

(51) Int. Cl.
*G06F 17/22* (2006.01)
*G07F 19/00* (2006.01)

(52) U.S. Cl.
USPC .......................................................... 705/31

(58) Field of Classification Search
USPC .......................................................... 705/31
See application file for complete search history.

(56) References Cited

U.S. PATENT DOCUMENTS

| | | | |
|---|---|---|---|
| 7,644,371 B2 * | 1/2010 | Robertson et al. | 715/810 |
| 7,665,027 B1 * | 2/2010 | Scalora et al. | 715/765 |
| 2002/0033850 A1 * | 3/2002 | Bates et al. | 345/853 |
| 2003/0093348 A1 * | 5/2003 | Finn | 705/35 |
| 2004/0143509 A1 * | 7/2004 | De Almeida Prado et al. | 705/26 |
| 2006/0069690 A1 * | 3/2006 | Patel et al. | 707/100 |
| 2007/0179984 A1 * | 8/2007 | Watanabe | 707/200 |
| 2008/0068401 A1 * | 3/2008 | Albrecht et al. | 345/645 |
| 2008/0109762 A1 * | 5/2008 | Hundal et al. | 715/855 |
| 2008/0243786 A1 * | 10/2008 | Stading | 707/3 |
| 2009/0031236 A1 * | 1/2009 | Robertson et al. | 715/765 |

* cited by examiner

*Primary Examiner* — Seye Iwarere
(74) *Attorney, Agent, or Firm* — Osha Liang LLP

(57) ABSTRACT

A method for generating a visualization. The method includes receiving, from a user a request to complete a tax form including a first field, presenting a first and second tax query corresponding to the first field, receiving a first response corresponding to the first query and a second response corresponding to the second query, and determining a first value corresponding to the first field using a decision tree corresponding to the first field, and the second response. The method also includes generating a completed tax form including the first value in the first field, generating a visualization corresponding to the first field which graphically depicts a relationship between the first value and the first response and the second response, and displaying the completed tax form and the visualization on a display device with the completed tax form depicting a relationship between the visualization and the first value.

21 Claims, 10 Drawing Sheets

1040EZ            2009

First Name:     Last Name:
Address:

Income
1. ___
2. ___
   ⋮
6. ___

Payment, Credit, and Tax
7. ___
8. ___
9a. Earned Income Credit

[View Visualization]

11. ___

Refund
12. ___

Amount You Owe
13. ___

Sign Here
Your Signature:     Date:

---

Earned Income Credit

Relevant Considerations
- Income
- Dependents
- Other

Relevant Queries

Income:
3. Total wages, salary, and tips
4. Total taxable interest
5. Unemployment compensation Dependents:
7. Number of dependents
9. Age of dependent
10. Relationship to dependent
13. Did dependent live with you?

Other:
2. Social Security No.
3. Age
6. Single or Marred
11. Do you qualify as a dependent of another?
12. Was your home in the US?

FIG. 6

Tax Survey

702 — Personal Information
1. Name: John Smith
2. Social Security Number: 123-45-6789
3. Age: 30

704 — Income Information
4. Total wages, salaries, and tips: $30,000
5. Total taxable interest: $0
6. Unemployment compensation in excess of $2,400: $0

706 — Family Information
7. Single or Married: Single
8. Number of dependents: 1
9. Name of Dependent: Dirk Smith
10. Age of Dependent: 6 years
11. Relationship to dependent: Father
12. Do you qualify as the dependent of another person: No 708 — Residential Information
13. Was your home in the United States for more than half of 2009: Yes
14. Did your dependant live with you for more than half of 2009: Yes

| First Name: John | Last Name: Smith |
| --- | --- |
| Address: | |

Income

| 1. ─────── | 1. ─── |
| --- | --- |
| 2. ─────── | 2. ─── |
| ⋮ | |
| 6. ─────── | 6. ─── |

Payment, Credit, and Tax

| 7. ─────── | 7. ─── |
| --- | --- |
| 8. ─────── | 8. ─── |
| 9a. Earned Income Credit | 9a. $1000 |
| ⋮ | |
| 11. ─────── | 11. ─── |

View Visualization

Refund

| 12. ─────── | 12. ─── |
| --- | --- |

Amount You Owe

| 13. ─────── | 13. ─── |
| --- | --- |

Sign Here

| Your Signature: | Date: |
| --- | --- |

FIG. 7B

VISUAL REPRESENTATION AND USER FEEDBACK ON CALCULATED FORM FIELDS

BACKGROUND

Every year, millions of Americans are required to file tax forms with the Internal Revenue Service. These forms are used to collect information about a taxpayer's income, deductions, and tax credits. However, the process of completing these tax forms correctly is often an arduous task for the average American. Thus, many taxpayers rely on professional accountants to understand United States tax law, and complete the required tax forms efficiently and correctly.

Taxpayers have numerous options for tax preparation. At present, computer applications for tax preparation exist that allow taxpayers to complete their tax forms without having to hire a professional. Most tax preparation applications present the user with a tax survey, which presents the taxpayer with a series of questions which are used to generate a completed tax form. Generally, these questions are directed to taxpayers who lack the knowledge and experience of a professional.

Because of the complexities of United States tax laws, questions presented to a taxpayer during a tax survey are often not directly taken from the questions listed on the tax form. Further, because of these complexities, it is often not intuitive to a taxpayer how the final tax form is generated. Thus, when a taxpayer uses a computer application for tax preparation, there is often a disconnect in the mind of the taxpayer between the relevance of the questions presented in the survey and the final tax form that is generated.

SUMMARY

In general, in one aspect, the invention relates to a method for generating a visualization. The method includes receiving, from a user via an input device, a request to complete a tax form, where the tax form includes a first field. The method also includes presenting the user with a first tax query and a second tax query corresponding to the first field, receiving, from the user, a first response corresponding to the first query and a second response corresponding to the second query, and determining a first value corresponding to the first field using a decision tree corresponding to the first field, and the second response. The method also includes generating a completed tax form including the first value in the first field. The method also includes generating, based on the determination, a visualization corresponding to the first field, where the visualization graphically depicts a relationship between the first value and at least one selected from a group consisting of the first response and the second response. The method also includes displaying the completed tax form on a display device, and displaying the visualization on the display device with the completed tax form in a manner that depicts a relationship between the visualization and the first value.

In general, in one aspect, the invention relates to a computer readable storage medium comprising computer readable code that, when executed by a processor, is configured to receive, from a user via an input device, a request to complete a tax form, where the tax form includes a first field. The computer readable code is further configured to present the user with a first tax query and a second tax query corresponding to the first field, receive, from the user, a first response corresponding to the first query and a second response corresponding to the second query, and determine a first value corresponding to the first field, using a decision tree corresponding to the first field, the first response, and the second response. The computer readable code is further configured to generate a completed tax form including the first value in the first field, and generate, based on the determination, a visualization corresponding to the first field, where the visualization graphically depicts a relationship between the first value and at least one selected from a group consisting of the first response and the second response. The computer readable code is further configured to display the completed tax form on a display device, and display the visualization on the display device with the completed tax form in a manner that depicts a relationship between the visualization and the first value.

In general, in one aspect, the invention relates to a system for displaying a visualization. The system includes a graphical user interface (GUI) module executing on a processor and configured to receive, from a user via an input device, a request to complete a tax form, wherein the tax form includes a first field, where the tax form is stored in a tax form repository in a computer readable storage medium. The system also includes a tax survey module executing on the processor and configured to present the user with a first tax query and a second tax query corresponding to the first field, and receive, from the user, a first response corresponding to the first query and a second response corresponding to the second query. The system also includes a calculation module executing on the processor and configured to determine a first value corresponding to the first field, using a decision tree corresponding to the first field, the first response, and the second response, and generate a completed tax form including the first value in the first field. The system also includes a visualization module executing on the processor and configured to generate, based on the determination, a visualization corresponding to the first field, where the visualization graphically depicts a relationship between the first value and at least one selected from a group consisting of the first response and the second response. The GUI module is further configured to display the completed tax form on a display device, and display the visualization on the display device with the completed tax form in a manner that depicts a relationship between the visualization and the first value.

Other aspects of the invention will be apparent from the following description and the appended claims.

BRIEF DESCRIPTION OF DRAWINGS

FIG. 6 illustrates an example of a screenshot, according to one or more embodiments of the invention.

FIGS. 7A-7D illustrate an example of a method for generating a tax form and visualization, according to one or more embodiments of the invention.

DETAILED DESCRIPTION

Figure 1:
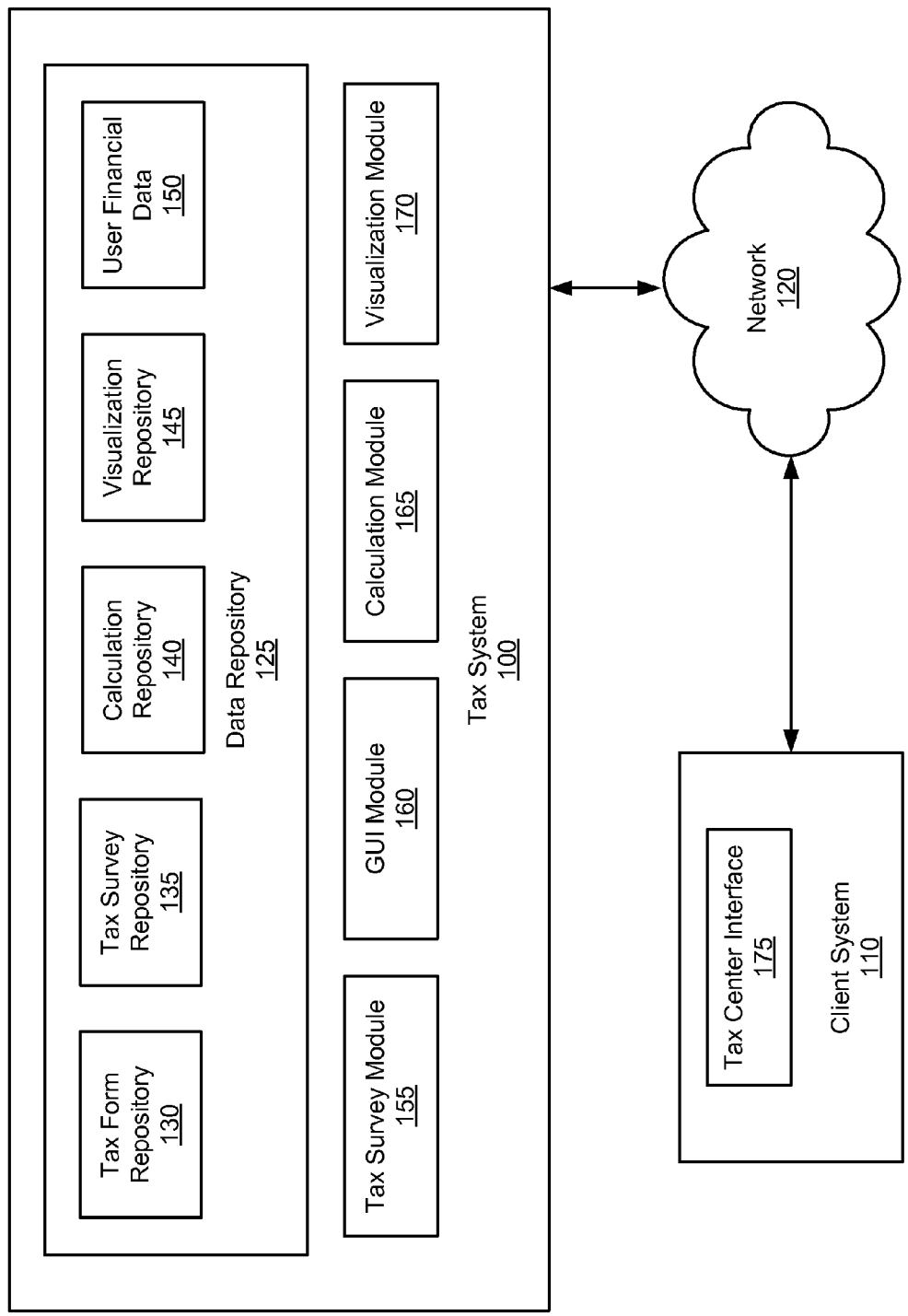
FIG. 1 shows a system architecture, according to one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, system, and computer readable medium for generating a visual representation and user feedback for a calculated form field. More specifically, embodiments of the invention solicit information from a taxpayer for a tax form using a tax survey. According to one or more embodiments of the invention, the form is generated using the solicited information and a decision tree to obtain a completed tax form. According to one or more embodiments of the invention, a visualization is generating to provide the user with a representation of the relationship between the solicited information and the completed tax form.

However, according to one or more embodiments of the invention, a user may opt to view a visualization in association with a field on an incomplete tax form. In this case, it is not necessary that the user complete a tax survey. This is an important distinction because, as follows below, the terms "user" and "taxpayer" are used interchangeably. While some embodiments of the invention are directed to a taxpayer using the invention to prepare a tax form, it is not necessary that a user be a taxpayer. A user could be anyone who is using the system for any purpose. For example, according to one or more embodiments of the invention, the claimed invention may be used for training or educational purposes, in order to help the user understand the relationship between information required to complete a tax form and how the tax form is finally generated. Further, according to one or more embodiments of the invention may be used by any user who is interested in better understanding the relationship between common financial or personal data and a tax form.

FIG. 1 shows a system architecture in accordance with one or more embodiments of the invention. The system includes a tax system (100) and a client system (110). The tax system (100) includes a data repository (125). According to one or more embodiments of the invention, the data repository (125) includes a tax form repository (130), a tax survey repository (135), a calculation repository (140), a visualization repository (145), and user financial data (150). The tax system also includes a number of modules, including a tax survey module (155), a graphical user interface (GUI) module (160), a calculation module (165), and a visualization module (170). Although each of the modules is separate and distinct, according to one or more embodiments of the invention, a single module may include the functionality of any combination of the modules. Similarly, although each of the repositories in the data repository (125) is separate and distinct, according to one or more embodiments of the invention, a single repository may store any combination of the repositories.

According to one or more embodiments of the invention, the tax form repository (130) is configured to store tax forms provided by the IRS. According to one or more embodiments of the invention, the tax form repository may include IRS forms 1040, 1040A, 1040EZ, or any other tax form provided by the IRS for tax preparation purposes. In addition, according to one or more embodiments of the invention, the tax form repository may also include tax forms provided by a state agency for state taxes, or any other similar government agency.

According to one or more embodiments, each of the tax forms includes a series of fields which must be completed by the taxpayer in order to report information regarding a taxpayer's income, tax credits, and deductions. Thus, according to one or more embodiments of the invention, in order to compete a tax form, a value must be assigned to each field. These forms will be discussed in further detail with regard to FIG. 6, below.

According to one or more embodiments of the invention, the tax survey repository (135) includes tax surveys and tax queries to be provided to a taxpayer in order to generate a completed tax form. According to one or more embodiments of the invention, the tax survey repository may include a tax survey for each tax form stored in the tax form repository (130). Further, according to one or more embodiments of the invention, a more general tax survey may be stored which may be used for any tax form.

According to one or more embodiments of the invention, the tax survey module (155) is configured to provide an interactive tax survey for a user, such as a taxpayer, in order to generate a completed tax form. According to one or more embodiments of the invention, the tax survey module is configured to solicit responses from a user to a series of tax queries in the form of a tax survey. The tax survey module is further configured to identify the proper tax form for the user and generate a completed tax form.

According to one or more embodiments of the invention, the tax survey module (155) is configured to dynamically present the user with a tax survey. Thus, according to one or more embodiments of the invention, the tax survey module (155) is configured to determine, based on responses to previously presented queries, which queries are applicable to present to the user next.

According to one or more embodiments of the invention, the calculation repository (140) comprises information required to calculate values to be entered on a complete tax form. According to one or more embodiments of the invention, the calculation repository (140) comprises calculation methods, such as decision trees, corresponding to each field in a tax form. According to one or more embodiments of the invention, the calculation repository (140) may also include a mapping between the calculation methods and relevant tax queries from the tax survey repository (135).

According to one or more embodiments of the invention, the visualization repository (145) comprises visual representations of how solicited information from a user relates to a final calculation for a field of the tax form. According to one or more embodiments of the invention, the visualizations are associated with the decision trees or other calculation methods located in the calculation repository (140).

According to one or more embodiments of the invention, each field in the tax forms is associated with at least one visualization. Further, according to one or more embodiments of the invention, the visualization repository (145) may include previously generated visualizations. These may include, for example, generic visualizations for incomplete tax forms (i.e., values have not been assigned to fields), visualization templates, or previously generated visualizations using pre-stored user data.

Further, according to one or more embodiments of the invention, each visualization may comprise several visualization components. Each visualization component may be associated with a portion of a decision tree or other calculation method. According to one or more embodiments of the invention, the visualizations may be images or animations.

According to one or more embodiments of the invention, the data repository (125) also includes user financial data (150). According to one or more embodiments of the invention, a taxpayer may store financial data or other personal data in the tax system (100) in order to expedite generating the tax form. According to one or more embodiments of the invention, this may occur when, for example, a user has a login account with the tax system (100), and the tax system (100) has previously stored financial and other personal data for the user.

According to one or more embodiments of the invention, the tax system (100) also includes a calculation module (165). According to one or more embodiments of the invention, the calculation module (165) uses data solicited from a taxpayer using the tax survey module (155) and the decision trees and other algorithms stored in the calculation repository (140) to calculate values for each field in a determined tax form (i.e. those found in the tax form repository (130)). According to one more embodiments of the invention, the decision trees provide a logical representation of the algorithm required to determine a value for a field in a tax form, taking into consideration mathematics and tax law. Additionally, according to one or more embodiments of the invention, the calculation module may calculate values for the tax form using data stored in the user financial data (150).

The tax system (100) also includes a visualization module (170).

According to one or more embodiments of the invention, the visualization module (170) is configured to generate a visual representation in association with a field or value on a tax form that educates a user regarding how the value for the field is calculated. According to one or more embodiments of the invention, each field on the tax form is associated with a visualization. According to one or more embodiments of the invention, each visualization may include more than one visualization component. According to one or more embodiments of the invention, a visualization is associated with a decision tree. Further, according to one or more embodiments of the invention, each visualization component of a visualization may be associated with a portion of the decision tree corresponding to the visualization.

According to one or more embodiments of the invention, the visualization module (170) may generate a visualization by retrieving a previously stored visualization from the visualization repository (145). For example, a user may wish to understand how a value for a field on a tax form is generated without actually completing a tax form. Thus, the user does not need a customized visualization and instead, can use a predetermined visualization from the visualization repository (145).

According to another embodiment of the invention, the visualization and visualization components may be generated custom to the user requesting the visualization. Specifically, the visualization module (170) is configured to generate a visualization using the decision trees of in the calculation repository (140) and either solicited information from the user, or data stored in user financial data (150). According to one or more embodiments of the invention, the visualization may provide a visual representation of how the user information was used to calculate a value for a particular field in the tax form.

The tax system (100) also includes a GUI module (160), according to one or more embodiments of the invention. The GUI module (160) may be used, for example, to create a graphical layout of the generated tax forms and visualizations to display and a user's display device.

A taxpayer or other user may interact with the tax system (100) using a client system (110). The client system may be a separate computer system from the tax system (100), according to one or more embodiments of the invention. The client system (110) includes a tax center interface (175). According to one or more embodiments of the invention, the tax center interface (175) may be a web browser, used to connect the client system (110) to the tax system (100) across a network (120). Further, according to one or more embodiments of the invention, the tax center interface (175) may be a graphical user interface that allows a user or taxpayer to access the tax system (100).

According to one or more embodiments of the invention, the tax system (100) and the client system (110) are operatively connected across a network (120) (e.g., a local area network (LAN), a wide area network (WAN) such as the Internet, or any other similar type of network) via a network interface connection (not shown). However, according to one or more embodiments of the invention, this is not necessary, and the tax system (100) and the client system (110) may be directly operatively connected. Further, according to one or more embodiments of the invention, the tax system (100) may be configured to be part of the client system (110). For example, the tax system (100) may be stored on a computer readable storage medium configured to execute on the client system.

Figure 2:
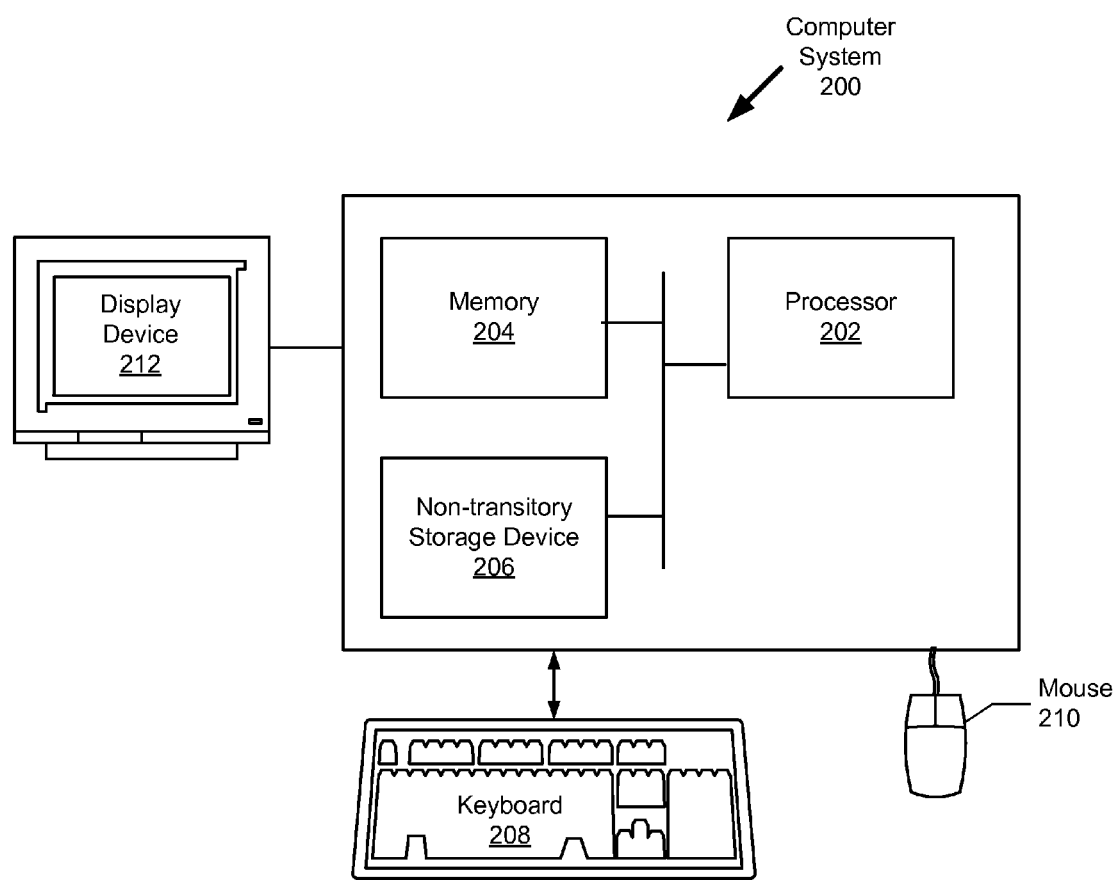
FIG. 2 shows a system architecture, according to one or more embodiments of the invention.

FIG. 2 shows a computer system architecture according to one or more embodiments of the invention. Specifically, according to one or more embodiments of the invention, FIG. 2 shows a system architecture for the tax system (100) or the client system (110), or both. As shown in FIG. 2, a computer system (200) includes one or more processor(s) (202) such as a central processing unit (CPU) or other hardware processor, associated memory (204) (e.g., random access memory (RAM), cache memory, flash memory, etc.), a non-transitory storage device (206) (e.g., a hard disk, an optical drive such as a compact disk drive or digital video disk (DVD) drive, a flash memory stick, etc.), and numerous other elements and functionalities typical of today's computers (not shown). The computer system (200) may also include input means, such as a keyboard (208), a mouse (210), or a microphone (not shown). Further, the computer system (200) may include a display device, such as a monitor (212) (e.g., a liquid crystal display (LCD), a plasma display, or cathode ray tube (CRT) monitor). Those skilled in the art will appreciate that many different types of computer systems exist, and the aforementioned input and output means may take other forms. Generally speaking, the computer system (200) includes at least the minimal processing, input, and/or output means necessary to practice embodiments of the invention.

Further, those skilled in the art will appreciate that one or more elements of the aforementioned computer system (200) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system (200). Alternatively, the node may correspond to a processor with associated physical memory. The node may alternatively correspond to a processor with shared memory and/or resources. Further, software instructions to perform embodiments of the invention may be stored on a non-transitory computer readable storage medium such as a compact disc (CD), a diskette, a tape, or any other computer readable storage device.

Figure 3:
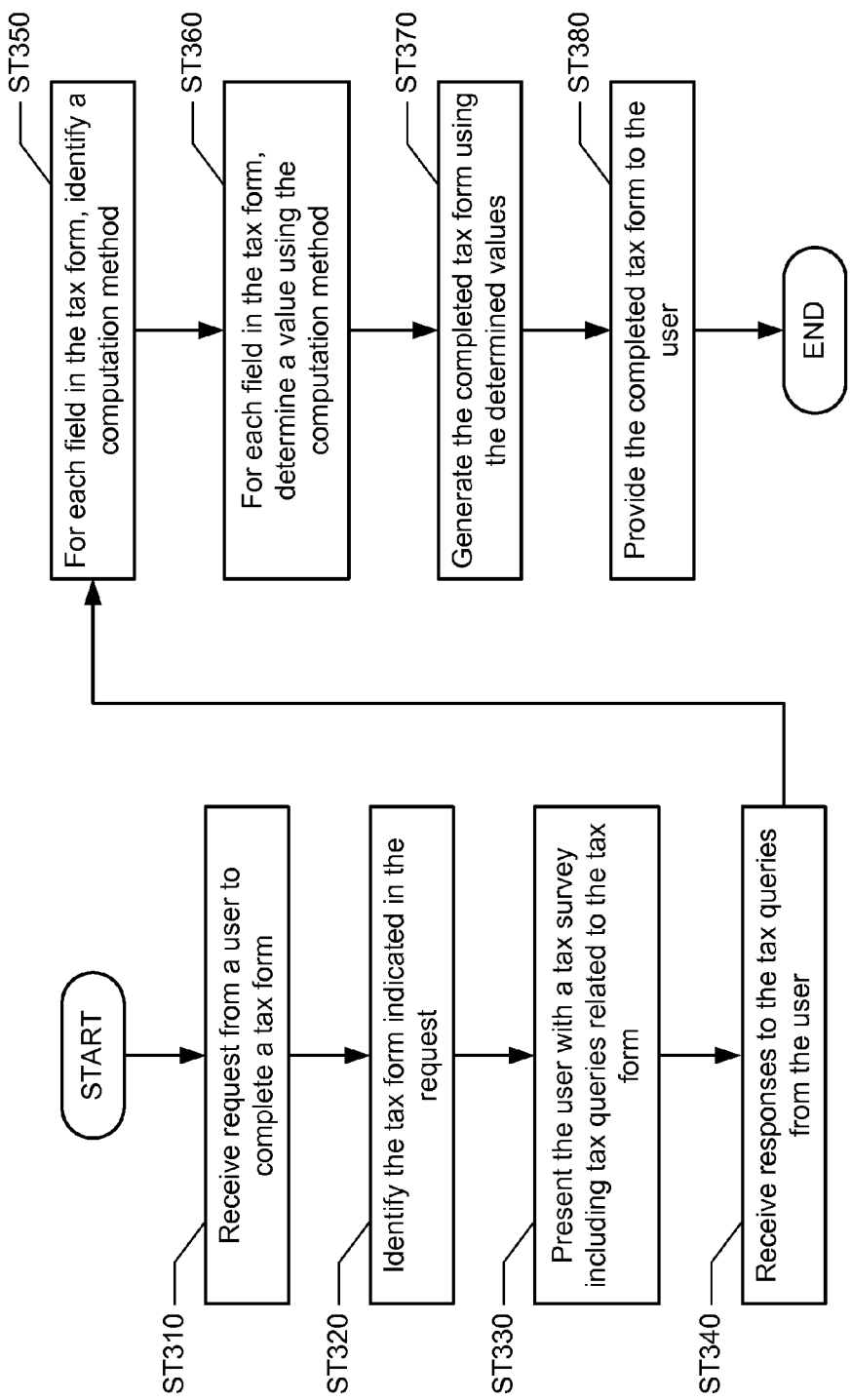
FIGS. 3-4 illustrate flowcharts detailing a method for generating a tax form and visualization, according to one or more embodiments of the invention.

FIG. 3 shows a flowchart, according to one or more embodiments of the invention. Specifically, FIG. 3 shows a flowchart detailing the method of completing a tax form for a user or taxpayer. While the various steps in this flowchart are presented and described sequentially, one of ordinary skill in the art will appreciate that some or all of the steps may be executed in different orders, may be combined or omitted, and some or all of the steps may be executed in parallel. In addition, steps such as store acknowledgements have been omitted to simplify the presentation.

At ST310, a request is received from a user to complete a tax for. According to one or more embodiments of the invention, the tax system (i.e., tax system (100)) receives the request via the tax center interface (175). According to one or more embodiments of the invention, the request may be transmitted via a user login to a tax system. Thus, according to one or more embodiments of the invention, the request may include a user identifier. This may be used, for example, to identify data corresponding to the user that may already be stored in the tax system, for example, in user financial data (150).

At ST320, a tax form indicated by the request is identified. According to one or more embodiments of the invention, the tax form may be indicated by the user. For example, the user may select to complete a tax form that is stored in the tax form repository (i.e., tax form repository (130)). However, according to one or more embodiments of the invention, a user may not specify a tax form to be completed. Rather, the flowchart continues at ST330.

At ST330, the user is presented with a tax survey, including tax queries related to the tax form, in the form of a tax survey. In the case that a tax form is not selected, a user will be presented with a global tax survey, which the tax system may use to identify the tax form. According to one or more embodiments of the invention, the queries are generated and retrieved using, for example, the tax survey module (155). These queries may be retrieved from, for example, the tax survey repository (135).

According to one or more embodiments of the invention, the survey may be generated dynamically, depending on user response while completing the survey. For example, if the user initially begins completing a global survey, and the user has provided responses to enough queries for the tax survey module to determine which tax form will be used, tax queries not required for the chosen tax form will not be provided to the user. Further, according to one or more embodiments of the invention, the tax system (i.e., tax system (100)), may have access to previously stored user financial data (i.e., data stored in user financial data (150)). Thus, if the tax system (100) already has access to user financial data, the tax survey module (155).

At ST340, the tax system receives responses to the tax queries from the user. According to one or more embodiments of the invention, along with ST330 above, the tax system may receive responses from the user dynamically, such that as responses from the user are received, the next queries to present to the user are determined. If, at ST320, the tax form was not identified, it will be identified by the end of ST340, according to one or more embodiments of the invention.

Although not shown in this figure, upon identification of the tax form, the tax form is retrieved. According to one or more embodiments of the invention, the tax form may be retrieved, for example, from the tax form repository (130) of the tax system (100). According to one or more embodiments of the invention, the tax system (100) may be configured to retrieve the tax form directly from the IRS, or another third party.

At ST350, for each field in the tax form, a computation method is identified. According to one or more embodiments of the invention, the identifying the computation method includes retrieving a decision tree for each field from the calculation repository. However, according to one or more embodiments of the invention, some fields in the tax form may enter data directly from the survey response rather than using a decision tree. This may happen, for example, a taxpayer's name or social security number.

At ST360, for each field in the tax form, a value is determined using the computation method for that field. Again, as described above, according to one or more embodiments of the invention, a decision tree may not be needed for every field. Thus, the computation method may be a decision tree, a pointer to received data or stored data, or some other computation method.

At ST370, a completed tax form is generated using the determined values from ST360 above. According to one or more embodiments of the invention, generating the completed tax form includes generating an electronic document version of the tax form and electronically entering the determined values into their corresponding fields.

At ST380, the user is provided with the completed tax form. According to one or more embodiments of the invention, this involves presenting the user with a graphical representation of the electronic document generated in ST370 above. According to one or more embodiments of the invention, the electronic document is displayed to the user on a display device (i.e., display device (212)).

Figure 4:
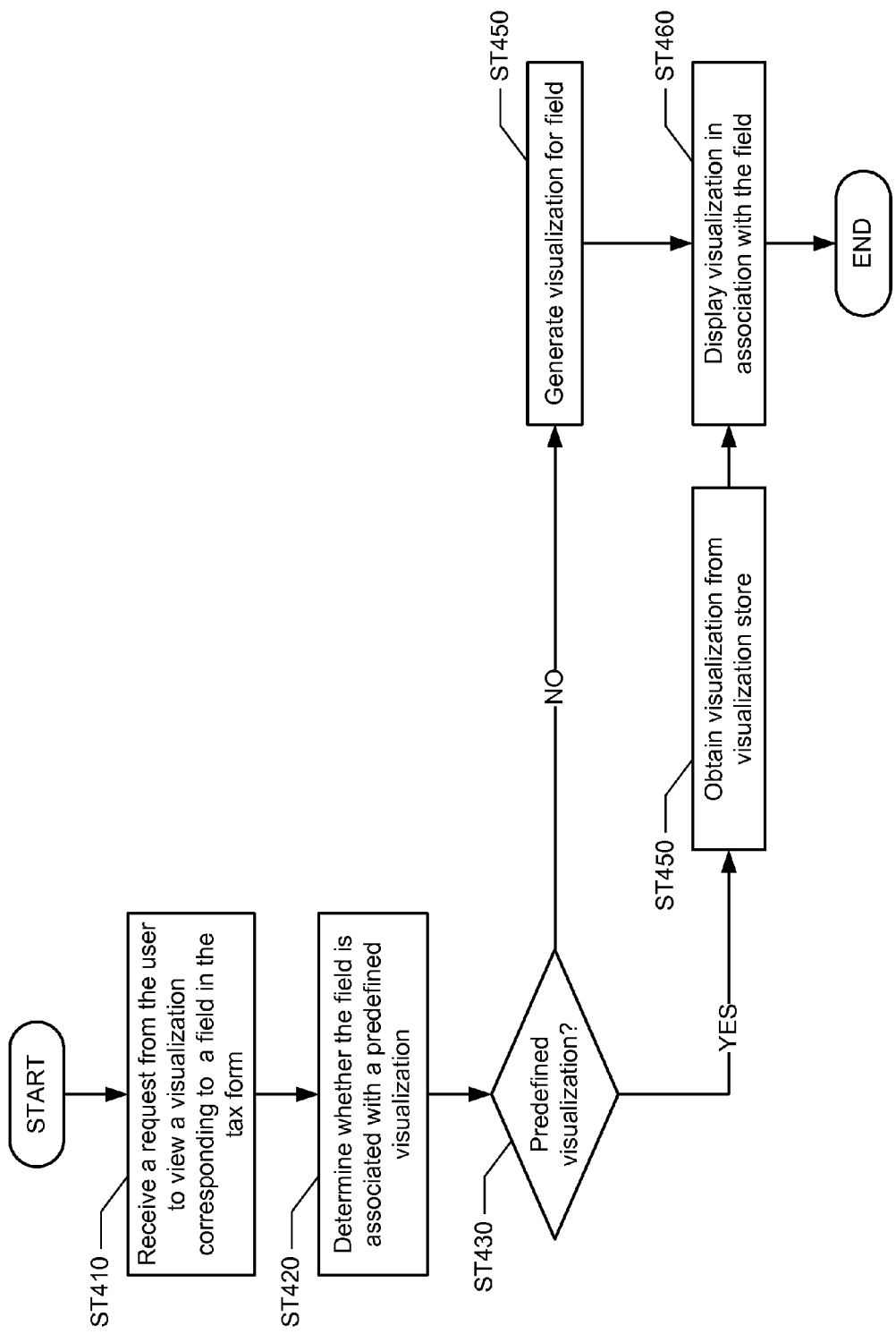

FIG. 4 shows a flowchart, according to one or more embodiments of the invention. Specifically, FIG. 4 shows a flowchart detailing the method of generating and presenting a visualization to a user or taxpayer. While the various steps in this flowchart are presented and described sequentially, one of ordinary skill will appreciate that some or all of the steps may be executed in different orders, may be combined or omitted, and some or all of the steps may be executed in parallel. In addition, steps such as store acknowledgements have been omitted to simplify the presentation.

At ST410, the tax system receives a request from a user to view a visualization corresponding to a filed in the tax form. According to one or more embodiments of the invention, the method described in FIG. 4 occurs upon completion of generating a completed tax form, as shown in FIG. 3. Thus, the tax form in ST410 is the tax form described in ST380 above. However, according to one or more embodiments of the invention, the tax system may generate a visualization for an incomplete tax form. For example, although not depicted in this flowchart, a user may select a tax form from the tax form repository (i.e., tax survey repository 130). Then the user can request to view a visualization corresponding to a field in the incomplete tax form.

At ST420, a determination is made whether the field is associated with a predefined visualization. According to one or more embodiments of the invention, generic visualizations for fields in a tax form may be stored in the tax system, for example, in the visualization repository (145). These generic visualizations may be available to present to a user regardless of whether the user has completed a tax survey. However, according to one or more embodiments of the invention, the user can select to view a generic visualization even if the user completed a tax survey.

According to one or more embodiments of the invention, a predefined visualization may also exist that is specific to the user. For example, if there was previously stored enough user financial data to complete a field in the form, a predefined visualization for the user might also be predetermined and prestored, for example, in the visualization repository (145).

At ST430, a determination is made whether to view a predefined visualization. According to one or more embodiments of the invention, the determination is solicited from the user. Further, according to one or more embodiments of the invention, the user may select between a predefined generic visualization (i.e., a visualization that has been previously generated without considering user data), or a predefined user-specific visualization (i.e., a visualization that has been previously generated using pre-stored user data.

At ST450, when a determination is made to view a predefined visualization, the visualization is obtained from the visualization store. According to one or more embodiments of the invention, the visualization module (i.e., visualization module (170)) obtains the predefined visualization from the visualization repository (145). According to one or more embodiments of the invention, the visualization may be a graphical image, or an animation. Further, according to one or more embodiments of the invention, the visualization is a graphical depiction of the relevant information required to determine the value for a field. This may include, for example, relevant considerations or relevant queries. According to one or more embodiments of the invention, the relevant queries may be found, for example, in the tax survey repository (135).

Further, according to one or more embodiments of the invention, the visualization repository (145) may include a mapping between decision trees in the calculation repository (140) and tax queries in the tax survey repository (135). Thus, according to one or more embodiments of the invention, a generic visualization may be a graphic depiction of the relationship between a decision tree and the relevant tax queries for that decision tree. Further, this relationship may be stored in the mapping found in the visualization repository (145), or along with the decision tree in the calculation repository (140). A more detailed discussion of this may be found below, in relation to FIG. 5.

Returning to ST430, in the case that the user does not select to view a predefined visualization, and instead selects to view a customized visualization that is not yet generated, the flow chart continues at ST450. Here, at ST450, a visualization for the field is generated. According to one or more embodiments of the invention, the visualization is generated by a visualization module (i.e., visualization module (170)).

According to one or more embodiments of the invention, the visualization is generated by using the user's information and the calculation methods to produce a graphical representation of how a value for the field was generated. Said another way, the customized visualization is a graphical representation of ST350, ST360, and ST370 from FIG. 3, as described above. Accordingly, one goal of the customized visualization, according to one or more embodiments of the invention, is to better inform the user of how a completed tax form is generated. Further, another goal of the customized visualization, according to one or more embodiments of the invention, is to provide a user with a better understanding of how responses to the tax survey impact the determined values for the tax form.

Generating the customized visualization can occur in a number of ways, according to one or more embodiments of the invention. For example, the visualization repository (145) may include visualization templates. According to one or more embodiments of the invention, each field in a tax form may be associated with one or more visualization templates. The custom visualization is generated by including the required user data in the template. According to one or more embodiments of the invention, this may be done using a mapping between the decision trees and the tax queries, as described above.

Further, according to one or more embodiments of the invention, generating the customized visualization may include determining whether a full visualization should be generated, or, in the case where a visualization includes more than one visualization component, a user may select to view only a single visualization component. Returning to ST430, according to one or more embodiments of the invention, when the user provides a selection to view a custom visualization, the tax system (100) may present the user with a series of options regarding how to view the custom visualization. According to one or more embodiments of the invention, this may include presenting a list of relevant considerations for the field. The user may then choose to view a visualization component depicting a visual representation of one of these considerations, or the user may choose to view a complete visualization (i.e., a visualization comprising all visualization components for the field).

According to one or more embodiments of the invention, the user may also select a type of visualization to view. For example, the user may request to view a graphical depiction of the relationship between relevant responses tax queries and the value for the field. Another example is that the user may request an animated depiction of the relationship between relevant responses to tax queries and the value for the field. Yet another example is that the user may select to view an animated depiction of how the value was determined, with the final value traveling across the screen from the depiction of how the value was determined to the field on the tax form. Those skilled in the art will appreciate that a visualization may be generated in any way to provide a graphical or animated depiction of the relationship between a tax query and a field in a tax form, and the above examples are not intended to limit the invention.

At ST460, the visualization is displayed in association with the field. According to one or more embodiments of the invention, the visualization is displayed on top of the tax form on a display device (i.e., display device (212)). According to another embodiment of the invention, the visualization is displayed adjacent to the tax form. According to another embodiment of the invention, the visualization is an animated image which travels across the display towards or away from the relevant field. Further, according to one or more embodiments of the invention, the visualization may be displayed as either a stationary image, or an animation traveling between the relevant questions in the tax query and the relevant field in the tax form. Those skilled in the art will appreciate that the visualization may be displayed in any way that provides the user with a graphical or animated depiction of a relationship between a tax query and a field in a tax form, and the above examples are not intended to limit the invention.

Figure 5:
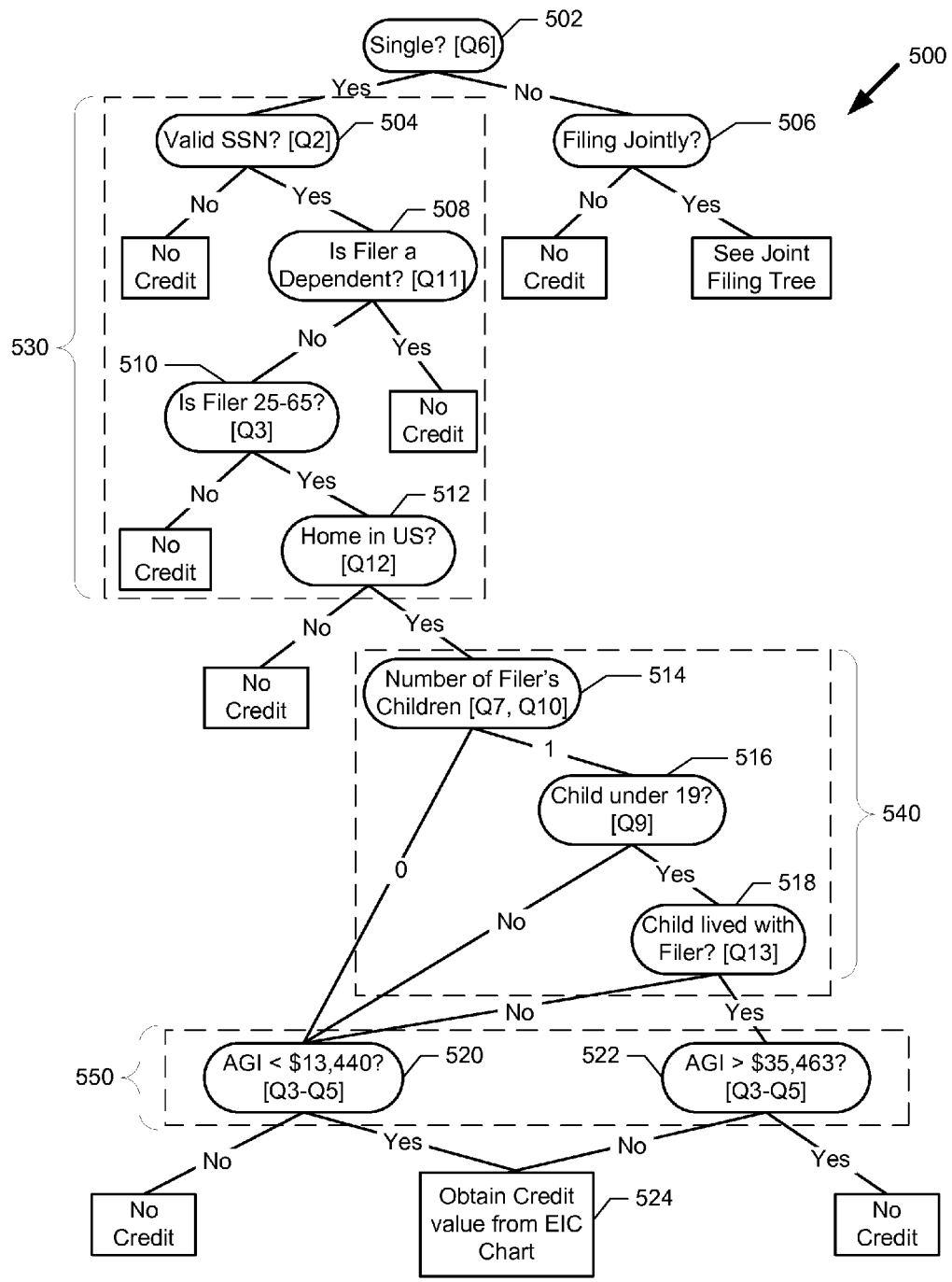
FIG. 5 illustrates an example of a decision tree, according to one or more embodiments of the invention.

FIG. 5 shows an example decision tree (500), according to one or more embodiments of the invention. Specifically, FIG. 5 shows an example of a decision tree used to determine how much earned income credit a taxpayer is allowed. Those skilled in the art will appreciate that decision tree (500) is drawn merely for purposes of the example. It is not intended to reflect accurately United States tax laws. Furthermore, those skilled in the art will appreciate that decision tree (500) is merely one example of a decision tree and is not intended to limit the scope of the invention.

According to one or more embodiments of the invention, the decision tree (500) includes a number of nodes (e.g., 502, 504, 506, 508, 510, 512, 514, 516, 518, 520, 522, and 524). According to one or more embodiments of the invention, the decision tree is configured to be traversed from the top node (i.e., 502) down through the tree until an outcome is reached (i.e., 524).

According to one or more embodiments of the invention, a decision tree (500) is used to generate a complete tax form. Further, according to one or more embodiments of the invention, the computation module uses the decision tree (500), as well as responses to tax queries from the user or other stored user information, in order to determine a value for a field in a tax form. As described above, decision tree (500) is an example of one that may be used to determine earned income credit for a taxpayer.

According to one or more embodiments of the invention, decision trees, such as decision tree (500), are used to generate visualizations. Further, according to one or more embodiments of the invention, a visualization may be associated with a field in a tax form, and with a decision tree for the field in the tax form. Each visualization may include several visualization components, which correspond to parts of the tree. Thus, in the present example, decision tree (500) may correspond to a visualization, whereas the three portions of the decision tree (i.e., 530, 540, 550), each correspond to a visualization component. The decision tree (500) may be divided into sections based on what type of information is used to determine the value for the field for those particular nodes (i.e., personal information, family information, income, etc.). These portions of the decision tree and their corresponding visualization components will be described in further detail below, in association with FIG. 7C.

According to this example, in order to determine a value for an earned income credit (EIC), the calculation module begins at the top node (502). Initially, a determination must be made whether the taxpayer is singe. As shown in node (502), this may be determined by referring to the response to query 7 ("Q7") of the tax survey. Those skilled in the art will appreciate that while the present example uses the number of the query, any identifier may be used to map the decision to the tax query.

Returning to node (502), if the taxpayer is found to not be single, then the traversal continues to node (506). At node (506), a determination is made regarding whether the taxpayer is filing jointly. In the case that the taxpayer is not filing jointly, it is determined that the taxpayer is not eligible for EIC. Returning to node (506), if it is determined that the taxpayer is filing jointly, then the decision tree continues with the joint filing tree. For purposes of simplicity of this example, the joint filing tree is identified as a separate tree. However, those skilled in the art will appreciate that the tree could also continue branching after node (506).

Returning to node (502), if it is determined that the taxpayer is single, then traversal of the decision tree (500) continues at node (504). At node (504), a determination is made regarding whether the taxpayer has a valid social security number. As depicted by node (504), the tax query that corresponds to this determination is query 2 (Q2). If it is determined that the taxpayer does not have a valid social security number, then the final determination is that the taxpayer does not qualify for EIC. If it is determined that the taxpayer does have a valid social security number, then traversal of decision tree (500) continues at node (508), where a determination is made regarding whether the filer (i.e., the taxpayer) qualifies as a dependent of someone else. The traversal continues until it is either determined that the taxpayer does not qualify for EIC, or, at node (524), the credit value is determined from a chart provided by the IRS. According to one or more embodiments of the invention, the chart may also be included in the decision tree (500), but is listed as an end node for purposes of this example.

According to one or more embodiments of the invention, decisions made at each node may be binary or otherwise. For example, at node (514), a determination is made regarding the number of children of the filer (i.e., taxpayer). Although the example only depicts two choices (i.e., 0 or 1), according to one or more embodiments of the invention, there may be more than two choices (i.e., 0, 1, 2, or 3 children). Further, according to one or more embodiments of the invention, determining a decision at a particular node may require analysis of more than one tax query. For example, at nodes (520) and (522), determining the taxpayer's adjusted gross income (AGI) requires analysis of responses to tax queries Q4-Q6.

FIG. 6 depicts an example of a tax form (600), according to one or more embodiments of the invention. More specifically, FIG. 6 depicts a tax form (600) in which a user has chosen to view a generic visualization (610) corresponding to a field in the tax form (600). Those skilled in the art will appreciate that the tax form (600) is a simplification of an actual tax form provided by the IRS for purposes of this example, and is not intended to be accurate. Further, those skilled in the art will appreciate that FIG. 6 is provided as an example of one or more embodiments of the invention, and is not intended to limit the invention.

FIG. 6 depicts a tax form (600) and a visualization (610). According to one or more embodiments of the invention, the tax form (600) and the visualization (610) are displayed to a user in the form of a graphical user interface displayed on a display device. According to one or more embodiments of the invention, tax form (600) includes a series of fields to be completed in order to report financial data to the IRS. In this example, tax form (600) includes a field corresponding to EIC (620). The field includes a place to enter a value (630). The user is provided with a selection to view a visualization (640). As described above, the user may be provided with a number of options to view a visualization. However, for purposes of this example, a single selection (640) is shown.

FIG. 6 also shows a visualization (610) in association with the EIC field (630), according to one or more embodiments of the invention. As described above, the visualization (610) may be depicted as a motionless graphic, or it may be depicted as an animation. In this example, the dotted lines extending from field (630) illustrate that the visualization is an animation that extends out from the field.

For purposes of this example, the visualization (610) corresponds to the decision tree (500) depicted in FIG. 5. For purposes of this example, the visualization (610) corresponds to EIC. In this example, visualization (610) includes a graphical depiction of relevant considerations, e.g., "Income," "Dependents," and "Others." The visualization (610) also includes relevant queries corresponding to those relevant considerations. Those skilled in the art will appreciate that while the example depicts the visualization components corresponding to relevant considerations, the components may correspond to any other method of dissecting the decision tree.

According to one or more embodiments of the invention, each relevant consideration is associated with a portion of the decision tree (500). For example, portion (550) of the decision tree (500) corresponds to "Income." As shown in FIG. 5, nodes (520) and (522), which make up portion (550), the relevant tax queries are "Q4-Q6." Returning to FIG. 6, these queries are depicted in the visualization under the "Income" consideration. As shown in visualization (610), the relevant tax queries include: 3) Total wages, salary, and tips; 4) Total taxable interest; and 5) Unemployment compensation. According to one or more embodiments of the invention, the query numbers are used as identifiers to determine which query is relevant in the tax survey.

Similarly, regarding visualization (610), the relevant considerations under "Dependents" are determined using portion (540) of the decision tree (500) as depicted in FIG. 5. Portion (540) of decision tree (500) includes nodes (514), (516), and (518), which depict decisions regarding dependents associated with the taxpayer. Finally, the relevant considerations under "Other" are determined using portion (530) of the decision tree (500). Thus, the relevant tax queries, as shown in nodes (504), (508), (510), and (512), include Q2, Q3, Q12, and Q13. This mapping will be explained in greater detail below, with regards to FIG. 7C.

Figure 7C:
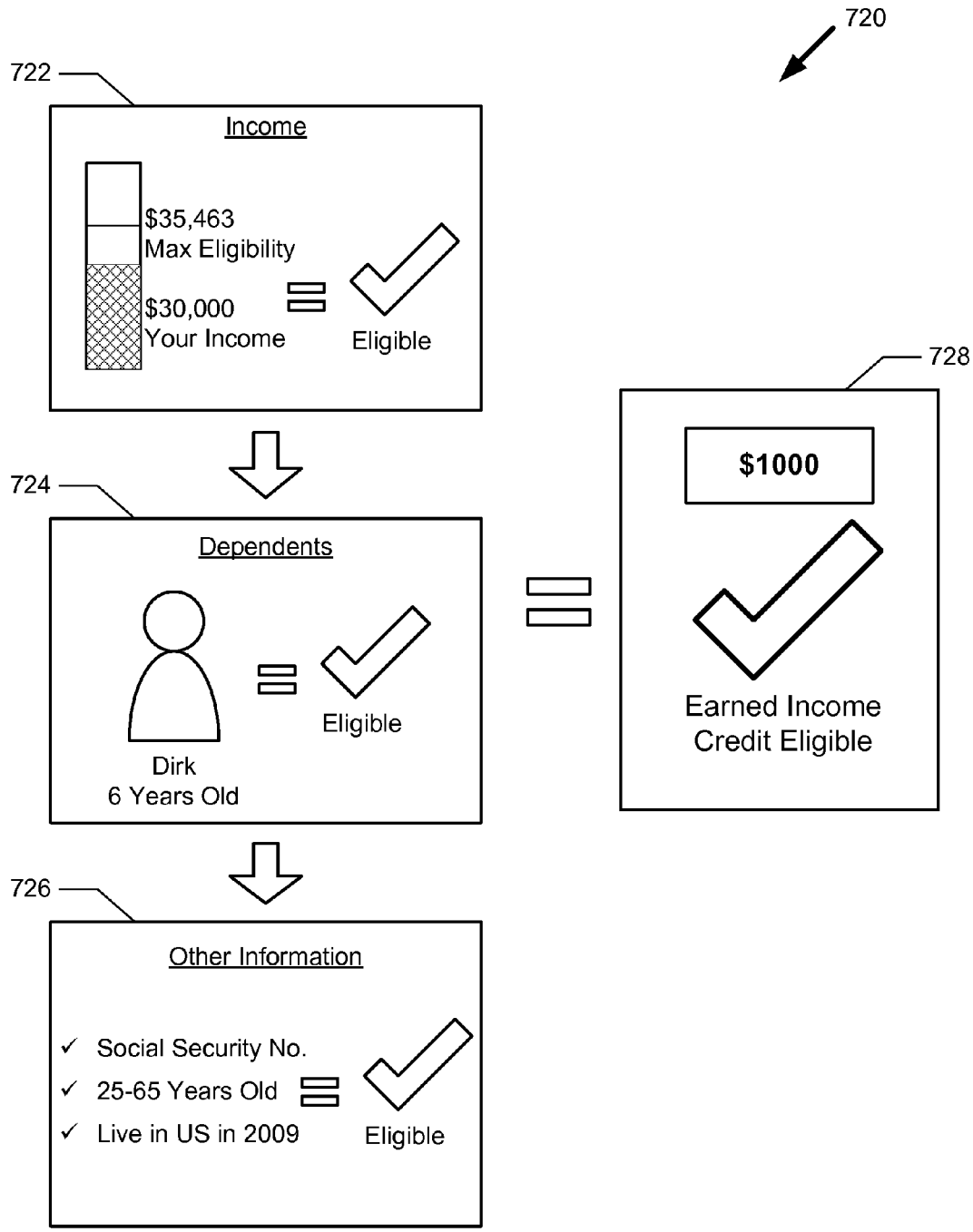
Figure 7D:
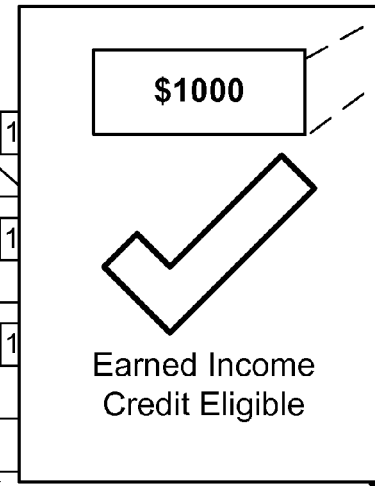

FIGS. 7A-7D provide an example implementation, according to one or more embodiments of the invention. However, those skilled in the art will appreciate that the example found in FIGS. 7A-7D are merely depict one implementation of the invention, and is not intended to limit the scope of the claims. Briefly, FIG. 7A illustrates an example of a tax survey, as it might be completed by a taxpayer using the tax system. FIG. 7B illustrates an example of a completed tax form as it might be generated using the completed tax survey of FIG. 7A. FIG. 7C illustrates an example of a visualization that might be generated using the completed tax survey of FIG. 7A. Finally, FIG. 7D illustrates how the taxpayer may view the visualization depicted in FIG. 7C.

Returning to FIG. 7A, it illustrates an example of a tax survey (700) that has been completed by a taxpayer. In this example, the tax survey (700) has requested several categories of information from the user. For purposes of this example, category (702) includes personal information, category (704) includes income information, category (706) includes family information, and category (708) includes residential information. In this example, personal information (702) includes tax queries 1-3 (Q1-Q3). Income information (704) includes tax queries 4-6 (Q4-Q6). Family information (706) includes tax queries 7-12 (Q7-Q12). Finally, residential information (708) includes tax queries 13-14 (Q13-Q14). According to one or more embodiments of the invention, the user may be presented with one category of queries at a time, or only a portion of a category of queries at a time, as the tax survey (700) may be generated dynamically. Further, those skilled in the art that the questions shown in the tax survey (700) are not intended to be complete, or to provide enough information to complete an actual tax form. The tax survey (700) has been simplified for purposes of this example.

As shown, for purposes of this example, the taxpayer's name is John Smith.

He is 30 years old, and has a six year old son named Dirk Smith. His social security number is 123-45-6789, and he made $30,000 in wages, salary, and tips in 2009. Mr. Smith is single, and Dirk is his only dependant. Further, Mr. Smith does not qualify as a dependent of anyone himself Mr. Smith listed that his home was in the United States for more than half of 2009, and Dirk lived with him for more than half of 2009.

FIG. 7B illustrates a completed tax form (710) that might be generated for Mr. Smith after tax survey (700) is complete. In this case, the field for Mr.

Smith's name (712) has been completed. According to one or more embodiments of the invention, the calculation module is configured to obtain this information from Q1 in tax survey (700). In addition, the tax form includes a field for earned income credit (EIC) (714). This field has been given a calculated value of $1000 (716). Finally, by selecting field (714) or value (716), Mr. Smith is given the option to view a visualization (718). Although the option (718) merely provides Mr. Smith with a single selection, as described above, according to one or more embodiments of the invention, Mr. Smith may be provided with the option to view a variety of visualizations. For example, a generic visualization for the field, or a visualization component.

In order to determine the value $1000 (716) for the EIC field (714) in the tax form (710), the tax system uses the responses to the tax queries (702)-(708) from the tax survey (700), and the decision tree (500) from FIG. 5. Thus, returning to the decision tree in FIG. 5, and using the completed tax survey of FIG. 7A, the tax system can identify the value. Beginning at node (502) of the decision tree (500), an initial determination must be made regarding whether the Mr. Smith is single. Node (502) includes a mapping to Q7 of the tax survey. Accordingly, the tax system references Q7 in the tax survey (700). Q7 indicates that Mr. Smith is single. Accordingly, traversal of the decision tree (500) continues at node (504). At node (504), a determination must be made regarding whether Mr. Smith has a valid social security number. Node (504) indicates a mapping to Q2 of the tax survey. Q2 indicates that Mr. Smith does have a valid social security number (i.e., 123-45-6789). Thus, traversal of the decision tree continues at node (510). At node (510), a determination must be made regarding whether Mr. Smith is between the ages of 25 and 65. Node (510) includes a reference to Q3 of the tax survey (700). Q3 indicates that Mr. Smith is 30 years old. Accordingly, traversal of the decision tree continues at node (512). At node (512), a determination is made regarding whether Mr. Smith's home was in the United States for at least half of 2009. Node (512) maps to Q13 of the tax survey (700). Q13 indicates that Mr. Smith's home was in the United States for more than half of 2009. Accordingly, traversal of the decision tree continues at node (514).

At node (514), a determination must be made regarding the number of Mr.

Smith's children. Node (514) maps to Q8 and Q11 of the tax survey (700). Although not shown, according to one or more embodiments of the invention, the tax system is configured to identify the relevant queries and determine the outcome for the decision tree node using the responses to those queries. In this example, Mr. Smith has one child. Accordingly, traversal of the decision tree continues at node (516). At node (516), a determination must be made regarding the number of children until 19. Node (516) maps to Q10 of the tax survey (700). Q10 indicates that Mr. Smith's one child is under the age of 19. Accordingly, traversal of the decision tree continues at node (518). At node (518), a determination must be made regarding whether the child lived with Mr. Smith for over half of 2009. Node (518) maps to Q14 of the tax survey (700). Q14 indicates that Mr. Smith's child did live with him for more than half of 2009. Accordingly, traversal of the decision tree continues at node (522).

Node (522) requires a determination whether Mr. Smith's adjusted gross income (AGI) is greater than $35,463. Node (522) references Q4-Q6 of the tax survey (700). Although no specific calculations are shown, they may also be included in node (522). For example, node (522) may require that the values in Q4-Q6 are added together to determine an AGI. Then that AGI is compared to $35,463. In this example, Mr. Smith's AGI is $30,000. Thus, it is not greater than $35,463, and traversal of the decision tree continues at (524). At node (524), a reference is made to obtain a credit value from the EIC chart. According to one or more embodiments of the invention, the EIC chart may be included in the decision tree. Further, according to one or more embodiments of the invention, the EIC chart may be separately stored, for example, in the calculation repository, or it may be obtained from the IRS or another third party. For purposes of this example, a credit value of $1000 is obtained from the EIC chart, and is used to complete field (714) of the tax form (710).

FIG. 7C shows an example of a visualization (720) that may be generated according to one or more embodiments of the invention. Although the visualization is depicted on its own for purposes of this example, the visualization is intended to be displayed in association with the completed tax form. For example, on top of the completed tax form or adjacent to the completed tax form.

In this example, the visualization (720) includes four visualization components. Visualization component (722) is associated with income. Returning to decision tree (500) depicted in FIG. 5, the portion of the decision tree (550) is used to generate visualization component (722). Further, portion (540) of the decision tree (500) is used to generate visualization component (724), associated with Dependents. In addition, portion (530) of the decision tree (500) is used to generate visualization component (726), associated with Other Information. Finally, visualization component (728) represents a final determined value for the field in the tax form. According to one or more embodiments of the invention, the visualization component may not be associated with any particular portion of the decision tree, but instead provide a more general visualization. However, although not shown in the example, according to one or more embodiments of the invention, a visualization component that depicts a final value for the field may be associated with a final node in the decision tree. In this example, visualization component (728) may be associated with node (524) of decision tree (500).

According to one or more embodiments of the invention, any or all visualization components may be displayed as a still image, or as an animation traveling across the display. Further, according to one or more embodiments of the invention, although not shown in the example, a visualization component depicted as an animation may be displayed as an animation of the visualization component being generated. For example, regarding visualization component (722), initially a user may see the term "Income" and a bar indicating "$35,463." Thus, for example, a visualization template may initially be displayed. Then, in the form of an animation, the user's income (i.e., "$30,000 Your Income"), and an associated mark on the eligibility bar is shown.

Further, each component (i.e., components (722), (724), (726)) may be displayed in association with the tax form either individually, or as a series. For example, according to one or more embodiments of the invention, the tax system may first display visualization component (722), followed by a combination of visualization components (722) and (724), followed by a combination of visualization components (722), (724), and (726), and finally show all visualization components on the display.

FIG. 7D depicts an example of a screenshot of a user viewing a visualization. In this case, a taxpayer (i.e., Mr. Smith) may choose to view a visualization. Although not shown, Mr. Smith may have chosen to merely view the final value. However, Mr. Smith may have also previously been shown visualization components (722), (724), and (726) prior to this screenshot, according to one or more embodiments of the invention. Further, although not shown, Mr. Smith could be shown the entire visualization as shown in FIG. 7C, according to one or more embodiments of the invention.

For purposes of this example, visualization component (728) is displayed as floating on top of the tax form (710). Visualization component (728) includes the final determined value (716) associated with field (714). The dotted lines connecting the term "$1000" in the visualization component (728) to the value (716) associated with field (714) is intended to depict for the user where the value came from. According to one or more embodiments of the invention, this visualization may be shown as the term "$1000" traveling across the screen from the visualization component (728) to match the determined value (716) associated with the EIC field (714).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating a visualization, comprising:
   receiving, from a user via an input device, a request to complete a tax form, wherein the tax form comprises a first field;
   presenting the user with a first tax query and a second tax query corresponding to the first field;
   receiving, from the user, a first response corresponding to the first query and a second response corresponding to the second query;
   determining, by a processor, a first value corresponding to the first field using a decision tree corresponding to the first field, the first response, and the second response;
   generating, by the processor, a completed tax form, wherein the completed tax form comprises the first value in the first field;
   generating, by the processor and based on the determination, a visualization corresponding to the first field, wherein the visualization graphically depicts a relationship between the first value and at least one selected from a group consisting of the first response and the second response;
   displaying the completed tax form on a display device; and
   displaying the visualization on the display device with the completed tax form in a manner that depicts a relationship between the visualization and the first value.

2. The method of claim 1, wherein determining the first value corresponding to the first field comprises:
   identifying the decision tree corresponding to the first field, wherein the decision tree comprises a first node, a second node, and a third node, and wherein the decision tree is stored in a tax computation repository.

3. The method of claim 2, wherein generating the visualization comprises generating a visual depiction of calculating the first value.

4. The method of claim 2,
   wherein the visualization comprises a first visualization component and a second visualization component, and
   wherein the first visualization corresponds to the first node, and the second visualization corresponds to the second node and the third node.

5. The method of claim 4, further comprising:
   prompting the user to select at least one component from a group consisting of the first visualization component and the second visualization component;
   displaying the at least one component selected by the user on the display device.

6. The method of claim 4, wherein the first visualization component comprises one selected from a group consisting of an animation and an image.

7. The method of claim 1, wherein the visualization comprises a graphical representation of the first value, and wherein displaying the visualization comprises depicting the graphical representation of the first value traveling across the display from the visualization to the first field.

8. A non-transitory computer readable storage medium comprising computer readable code that, when executed by a processor, is configured to:

receive, from a user via an input device, a request to complete a tax form, wherein the tax form comprises a first field;

present the user with a first tax query and a second tax query corresponding to the first field;

receive, from the user, a first response corresponding to the first query and a second response corresponding to the second query;

determine a first value corresponding to the first field, using a decision tree corresponding to the first field, the first response, and the second response;

generate a completed tax form, wherein the completed tax form comprises the first value in the first field;

generate, based on the determination, a visualization corresponding to the first field, wherein the visualization graphically depicts a relationship between the first value and at least one selected from a group consisting of the first response and the second response;

display the completed tax form on a display device; and display the visualization on the display device with the completed tax form in a manner that depicts a relationship between the visualization and the first value.

9. The non-transitory computer readable storage medium of claim 8, wherein the computer readable code configured to determine the first value corresponding to the first field is further configured to:

identify a decision tree corresponding to the first field, wherein the decision tree comprises a first node, a second node, and a third node, and wherein the decision tree is stored in a tax computation repository, and calculate the first value using the decision tree, the first response, and the second response.

10. The non-transitory computer readable storage medium of claim 9, wherein the computer readable code is configured to generate the visualization is further configured to generating a visual depiction of calculating the first value.

11. The non-transitory computer readable storage medium of claim 10, wherein the visualization comprises a first visualization component and a second visualization component, and wherein the first visualization corresponds to the first node, and the second visualization corresponds to the second node and the third node.

12. The non-transitory computer readable storage medium of claim 11, wherein the computer readable code is further configured to:

prompt the user to select at least one component from a group consisting of the first visualization component and the second visualization component; and display the at least one component selected by the user on the display device.

13. The non-transitory computer readable storage medium of claim 11, wherein the first visualization component comprises one selected from a group consisting of an animation and an image.

14. The non-transitory computer readable storage medium of claim 11, wherein the visualization comprises a graphical representation of the first value, and wherein displaying the visualization comprises depicting the graphical representation of the first value traveling across the display from the visualization to the first field.

15. A system for displaying a visualization, comprising:

a processor;

a graphical user interface (GUI) module executing on the processor and configured to receive, from a user via an input device, a request to complete a tax form, wherein the tax form comprises a first field, wherein the tax form is stored in a tax form repository in a computer readable storage medium;

a tax survey module executing on the processor and configured to:

present the user with a first tax query and a second tax query corresponding to the first field;

receive, from the user, a first response corresponding to the first query and a second response corresponding to the second query;

a calculation module executing on the processor and configured to:

determine a first value corresponding to the first field, using a decision tree corresponding to the first field, the first response, and the second response, and generate a completed tax form, wherein the completed tax form comprises the first value in the first field; and a visualization module executing on the processor and configured to generate, based on the determination, a visualization corresponding to the first field, wherein the visualization graphically depicts a relationship between the first value and at least one selected from a group consisting of the first response and the second response, wherein the GUI module is further configured to:

display the completed tax form on a display device, and display the visualization on the display device with the completed tax form in a manner that depicts a relationship between the visualization and the first value.

16. The system of claim 15, wherein the calculation module is further configured to:

identify the decision tree corresponding to the first field, wherein the decision tree comprises a first node, a second node, and a third node, and wherein the decision tree is stored in a calculation repository, and calculate the first value using the decision tree, the first response, and the second response.

17. The system of claim 16, wherein the visualization comprises generating a visual depiction of calculating the first value.

18. The system of claim 17, wherein the visualization comprises a first visualization component and a second visualization component, and wherein the first visualization corresponds to the first node, and the second visualization corresponds to the second node and the third node.

19. The system of claim 18, wherein the GUI module is further configured to:

prompt the user to select at least one component from a group consisting of the first visualization component and the second visualization component;

display the at least one component selected by the user on the display device.

20. The system of claim 18, wherein the first visualization component comprises one selected from a group consisting of an animation and an image.

21. The system of claim 17, wherein the first visualization component is stored in a visualization repository.

* * * * *